July 13, 1926.

C. T. CHUMNEY

STALK CUTTING MACHINE

Filed Sept. 6, 1924    3 Sheets-Sheet 1

1,592,724

C. T. Chumney INVENTOR

BY Victor J. Evans ATTORNEY

WITNESS: L. B. James

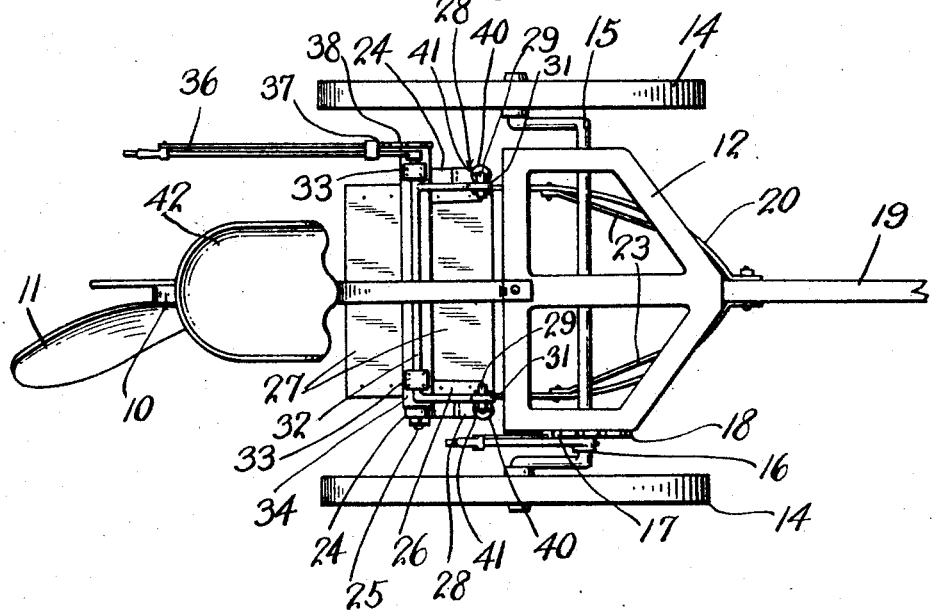
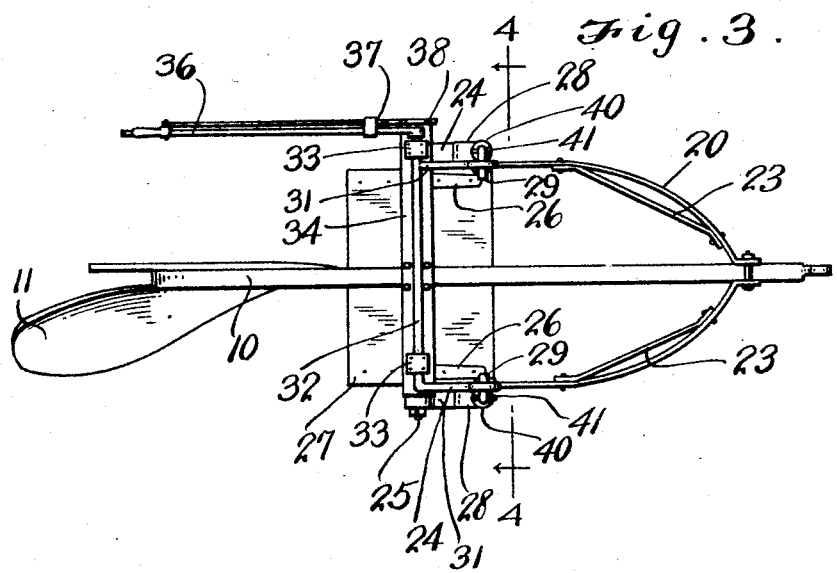

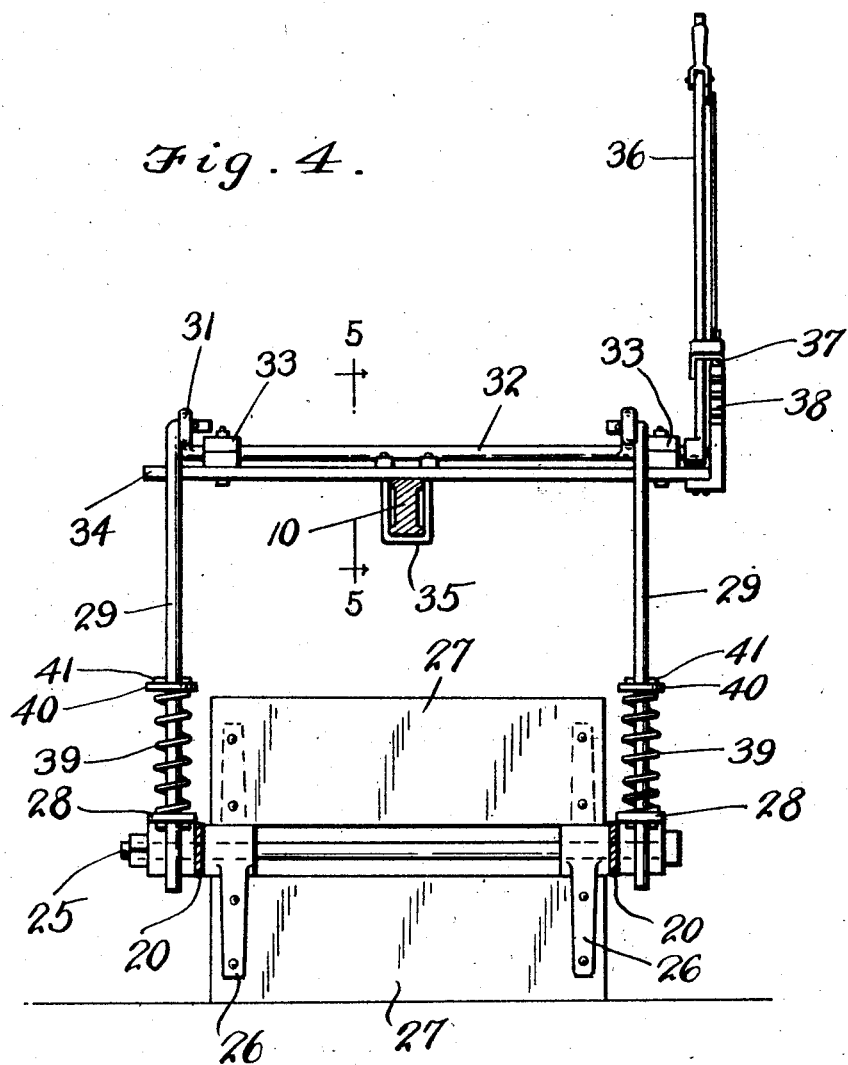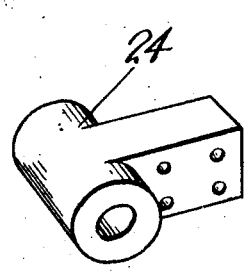

Patented July 13, 1926.

1,592,724

UNITED STATES PATENT OFFICE.

CHARLES T. CHUMNEY, OF GEORGETOWN, TEXAS.

STALK-CUTTING MACHINE.

Application filed September 6, 1924. Serial No. 736,288.

This invention relates to agricultural machines and has especial relation to stalk cutting machines, an object being to provide a stalk cutter which is capable of attachment to a plow so as to provide a combined cutter and plow, whereby corn stalks and the like may be cut and turned under the soil during the operation of plowing.

Another object of the invention is the provision of a stalk cutter attachment which may be secured to either a walking or sulky plow, the construction and manner of attachment being such that the cutter will act to prevent lateral tilting movement of the plow and thus reduce labor of plowing, especially with the ordinary walking plow.

Another object of the invention is the provision of a stalk cutter attachment which may be adjustably secured to a plow and in which the cutter is yieldingly and adjustably mounted, whereby the cutter will give when passing over obstructions, or may be raised above the ground when not in use.

With the above and other objects in view, the invention further includes the following novel features and details of construction, to be hereinafter more fully described, illustrated in the accompanying drawings and pointed out in the appended claim.

In the drawings:—

Figure 2 is a top plan view of the same.

Figure 3 is a plan view showing the attachment applied to a walking plow, the handles of the latter being removed.

Figure 4 is an enlarged sectional view taken substantially on the line 4—4 of Figure 3.

Figure 7 is a detail perspective view of one of the bearings for the cutter shaft.

Figure 1:
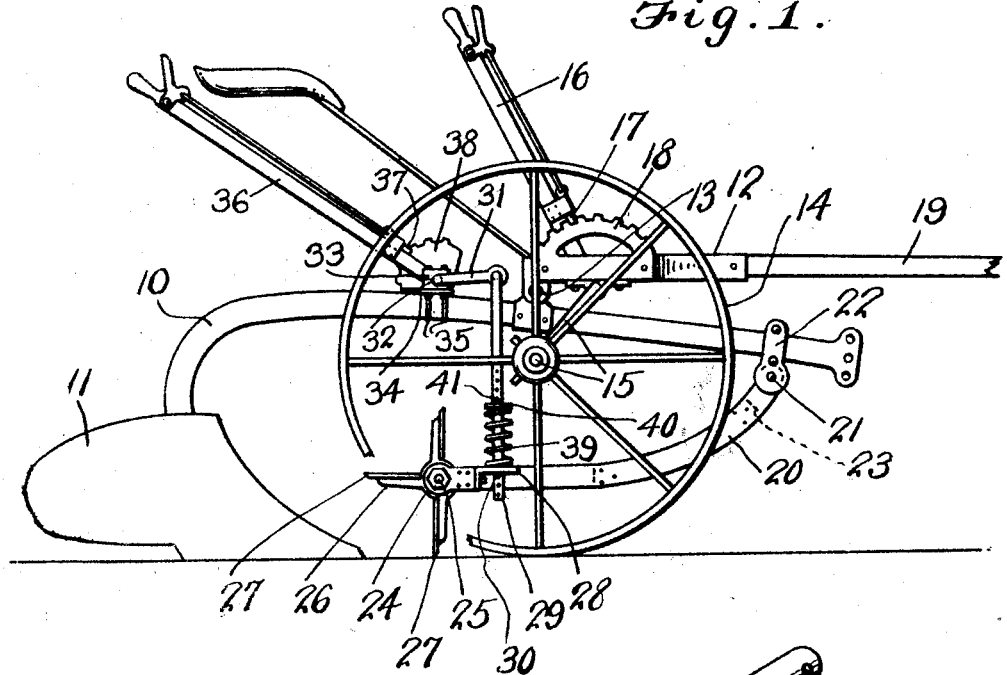
Figure 1 is a side elevation showing the invention applied to a plow.
Figure 5:
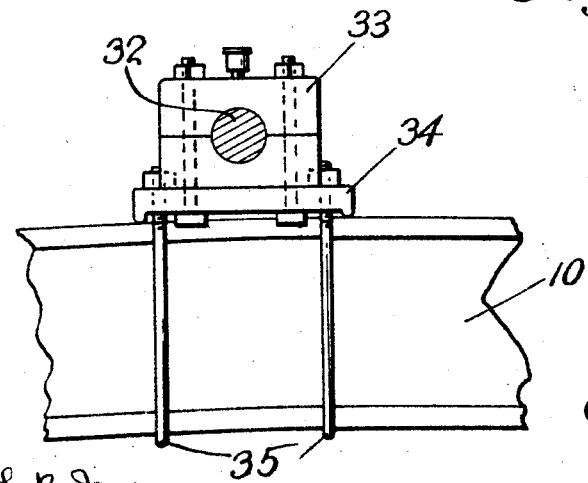
Figure 5 is an enlarged fragmentary section on the line 5—5 of Figure 4.
Figure 6:
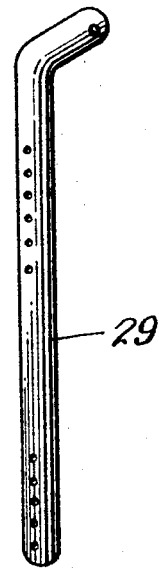
Figure 6 is a detail perspective view of one of the pressure bars.

Referring to the drawings in detail wherein like characters of reference denote corresponding parts, the reference character 10 indicates a plow beam and 11 a blade carried thereby. In Figures 1 and 2 of the drawings the beam is shown as attached to a wheel supported frame 12, an attachment being effected by means of a pivotal connection indicated at 13. The wheels which are shown at 14 are carried at opposite ends of a substantially U-shaped axle 15 which is mounted in bearings provided in the frame 12 and which is capable of adjustment so as to regulate the depth of the plow blade 11. For this purpose the axle 15 has secured thereto an adjusting lever 16 which carries a spring actuated dog 17, the latter engaging a toothed segment 18 secured to the frame 15. Extending from the frame 15 is a pole 19.

The invention which is secured to the plow beam 10 comprises a cutter frame which includes rearwardly diverging side arms 20, the forward ends of which are pivotally secured as indicated at 21 to a clamp 22 which is secured to the beam 10. The side bars 20 are provided with reinforcing strips or braces 23.

Secured to the rear ends of the side bars 20 are bearing members 24 and mounted in these members is a shaft or axle 25, the latter being secured in place by any suitable means. Secured upon the shaft or axle 25 are spaced spiders 26 which include radially extending arms, while secured to these arms are transversely extending plates which are sharpened at one edge to provide cutting blades 27. A cutter is thus provided which is rotatably mounted in the rear end of the cutter frame in advance of the plow blade 11, the purpose being to cut the corn stalks or other material in advance of the plow blade so that the latter will turn the cut stalks under the soil.

Secured upon opposite sides of the side bars 20 of the cutter frame are brackets 28. These brackets are provided with openings for the passage of the lower ends of pressure bars 29. The bars 29 are provided with spaced openings for the passage of pins 30 whereby movement of the bars through the brackets 28 in one direction will be limited. The upper ends of the bars 29 are secured to the outer ends of crank arms 31, the latter extending from opposite ends of the rock shaft 32. This shaft is mounted in bearings 33 provided in a cross bar 34, the said bar being secured to the beam 11 by means of a U-shaped clip 35. Secured to the rock shaft 32 is an adjusting lever 36 which carries a spring actuated dog 37, the latter being adapted to engage a toothed segment 38 secured to one end of the bar 34. Means are thus provided for adjusting the height of the stalk cutter.

In order to yieldingly force the stalk cutter downward, the pressure bars 29 have mounted thereon coiled springs 39. The lower ends of these springs bear upon the brackets 28 while their upper ends bear against collars 40 which are adjustable upon the rods 29 by pins 41. These pins are adapted to be positioned in spaced openings provided in the bars so that the tension of the springs 39 may be regulated.

In Figures 3 and 4 of the drawings the invention is shown as attached to an ordinary walking plow, the handles of which have been removed. Thus, by attaching the handles, the plow may be used in the ordinary manner, or it may be attached as shown in Figures 1 and 2 of the drawings so as to provide a sulky plow. In the latter event there is provided a seat 42.

When the invention is used in connection with the walking plow, the cutter will act to steady the plow and prevent lateral tilting movement due to the fact that the cutter extends transversely beneath the plow beam.

The invention is susceptible of various changes in its form, proportions and minor details of construction and the right is herein reserved to make such changes as properly fall within the scope of the appended claim.

Having described the invention what is claimed is:—

The combination with a plow, of a frame including rearwardly diverging side members connected together at their forward ends, means for connecting the forward end of the frame to the plow beam to permit of pivotal movement of said frame, a horizontally rotatable cutter mounted in the rear end of the frame transversely of the plow beam, a transversely disposed rock shaft mounted in bearings supported by the beam, crank arms at each end of the shaft, rods connecting the outer ends of the crank arms with the rear end of the frame, whereby the cutter may be vertically adjusted and means for yieldingly forcing the cutter downward.

In testimony whereof I affix my signature.

CHARLES T. CHUMNEY.